Nov. 10, 1931.  L. A. RUSSELL  1,830,810
SWING TRACTION GEARING
Filed Jan. 15, 1930  2 Sheets-Sheet 1
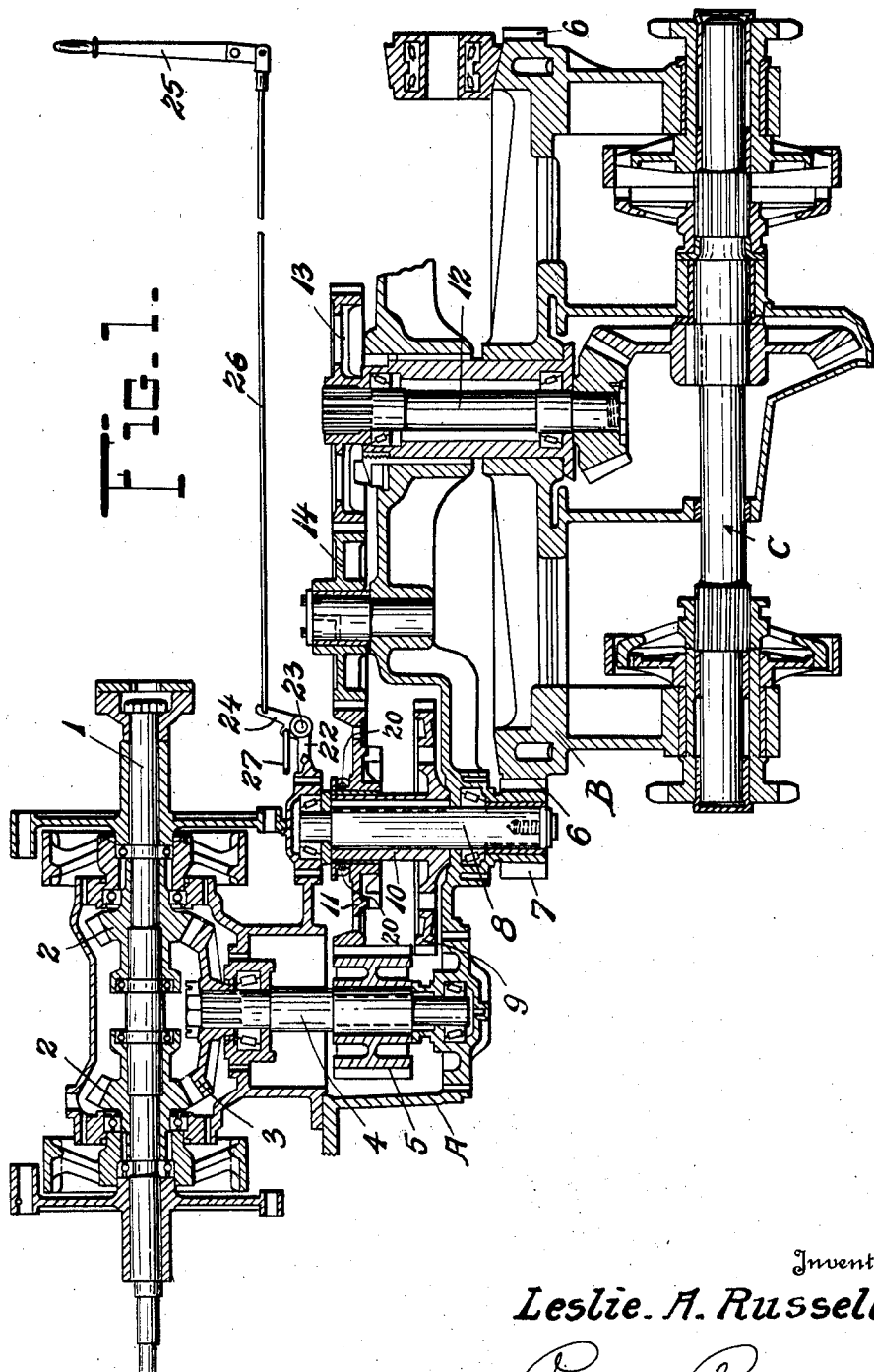
Inventor
Leslie. A. Russell.
By Robert Robb
Attorneys

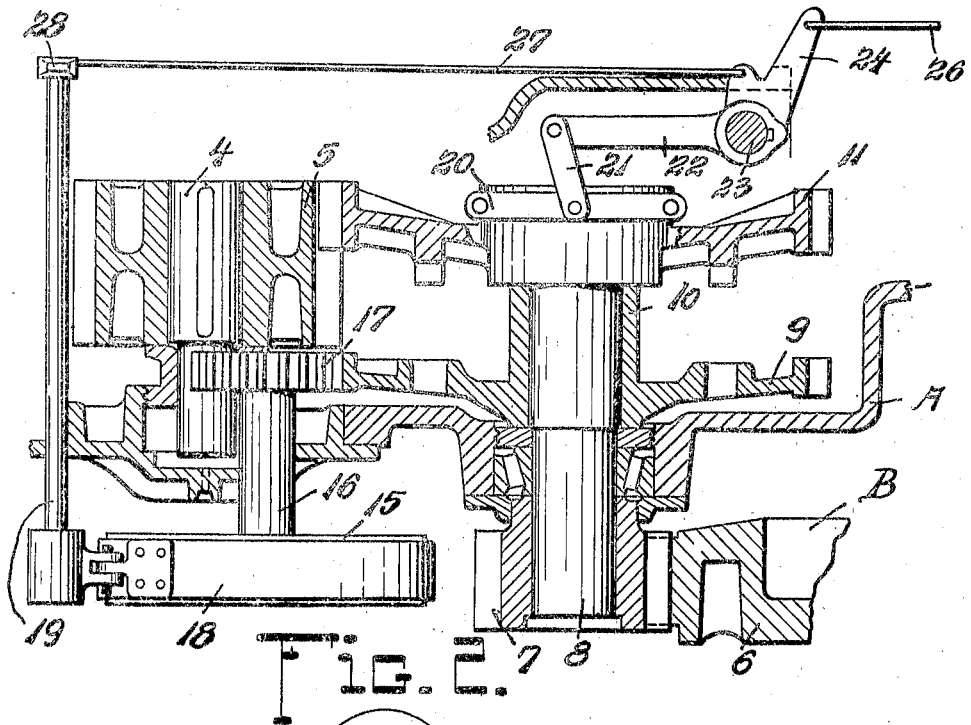
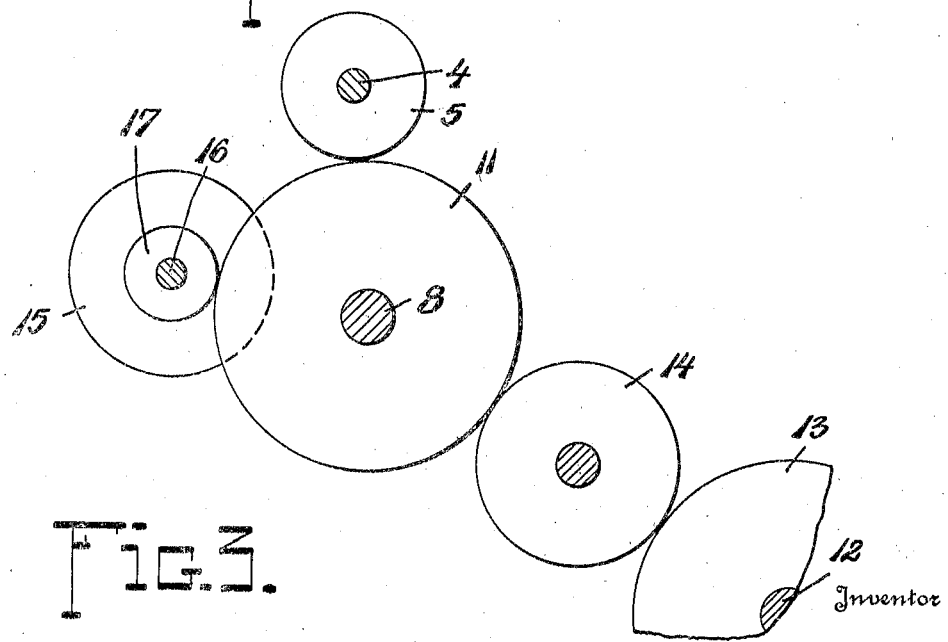

Patented Nov. 10, 1931

1,830,810

UNITED STATES PATENT OFFICE

LESLIE A. RUSSELL, OF MILWAUKEE, WISCONSIN, ASSIGNOR TO KOEHRING COMPANY, OF MILWAUKEE, WISCONSIN, A CORPORATION

SWING TRACTION GEARING

Application filed January 15, 1930. Serial No. 420,892.

The various mechanisms have been devised for use in excavating machines having a swing body and traction means whereby power may be selectively delivered either to swing the body or to operate the traction devices. Such mechanisms are often complicated and inefficient, requiring a large number of parts and being correspondingly costly to manufacture.

One of the objects of the present invention is the provision of a gearing assembly for selectively transmitting power either to the traction devices or to the means for swinging the body of an excavating machine. The gearing assembly which is the subject matter of the present invention is marked by its compactness, simplicity, and efficiency of drive.

In the use of a selective drive for transmitting power to the traction devices or the swing body, it is generally necessary to provide a swing brake for the body which is applied during periods when the traction devices are being operated. It has proved exceedingly difficult to make such a swing brake which is simple and effective to hold the body stationary in respect to the base when the excavating machine is in traction.

A further object of the invention is the provision of a swing brake which is operatively connected to the swinging means for the body in such a manner that a large mechanical advantage will be derived whereby a simple and small brake will effectively prevent the rotation of the swing body.

Going more into detail, a power shaft is provided with a wide faced pinion which is in constant mesh with a shiftable gear clutch. This shiftable gear clutch when in one of its positions is in mesh with a second gear or traction idler for driving the traction devices. In another position the shiftable gear clutch engages a similar gear clutch for causing a swinging of the body of the excavating machine. The swing brake is operatively connected to the second gear clutch by means of a pinion so that application of the swing brake is effective to prevent rotation of the body of the excavating machine. The second gear clutch is operatively connected with the swing pinion so that the swing brake derives a large mechanical advantage in respect to swinging action of the excavator body whereby such action is readily prohibited. Shifting instrumentalities for the shiftable gear clutch are provided together with connections to the swing brake whereby the brake is operated when the shiftable gear clutch is positioned for driving the traction devices.

With these and other objects and advantages in view, my invention comprises certain other novel combinations, constructions, and arrangements of parts as will be subsequently specified and claimed.

For a full and more complete understanding of the invention, reference may be had to the following description and accompanying drawings, in which—

Figure 1 is a sectional view with parts broken away, bringing out the relation of the gear clutches to the power shaft, traction devices, and means for swinging the body of the excavator.

Figure 2 is a sectional view showing the swing brake and its relation to the means for swinging the excavator body, and Figure 3 is a diagrammatic view bringing out the relationship of the power shaft, swing brake shaft, swing shaft, and traction shaft.

While a preferred specific embodiment of my invention is herein set forth, it is to be understood that I am not to be limited to the exact constructions illustrated and described because various modifications of these details may be provided in putting the invention into practice within the purview of the appended claims.

Referring first to Figure 1, an excavator body is partially shown at A, the body being mounted upon the traction base B. The excavating machine is provided with any suitable power transmission such as the shaft 1 which is operatively connected to a power source, not shown. The shaft 1 is provided with a pair of bevel gears 2 which constantly mesh a similar bevel gear 3 secured to the power shaft 4. Any known type of clutching device may be provided for transmitting reverse motions to the power shaft 4 by means of the gears 2 and 3. The power shaft 4 has secured thereto a wide faced pinion 5. The traction base B is provided with a swing gear 6 which is in mesh with a swing pinion 7 secured to a swing shaft 8. A gear clutch 9 is keyed to the swing shaft 8 and has an extended hub as shown at 10. Loosely mounted on the extended hub 10 and adapted to slide thereon is a second gear clutch 11 which is constantly in mesh with the wide faced pinion 5 secured to the power shaft 4. The traction base B is provided with any desirable type of traction devices denoted generally at C, which traction devices include a traction shaft 12 having a gear 13 secured thereto. A traction idler gear 14 meshes with the gear 13 and is adapted to receive power from the shiftable gear clutch 11 when the same is in the position shown in Figure 1. When the shiftable gear clutch 11 is moved downwardly, the power connection to the traction devices C is discontinued and the two gear clutches are brought into operative relation to operate the swing pinion, whereby swinging of the body A results.

Turning now to Figure 2, the swing brake comprises a brake drum 15 secured to a swing brake shaft 16. The swing brake shaft 16 also carries a pinion 17 which is non-rotatable in respect thereto and meshes with the gear clutch 9. A brake band 18 is adapted to cooperate with the brake drum 15 and has an operating shaft 19 therefor.

Shifting instrumentalities for shifting the gear clutch 11 are provided and include a yoke 20 to which is pivoted a link 21 which link is also pivoted to an arm 22 secured to a shaft 23. The shaft 23 may be rocked by means of a crank 24 secured thereto which is also operatively connected to a lever 25 by means of a rod 26. Another rod 27 having one of its ends connected to the crank 24, has its other end connected to a crank 28 which in turn is secured to the shaft 19 for operating the brake band 18.

The operation of the device is as follows:— Power is supplied to the power shaft 4 in reverse directions controllable at will by the operator of the excavating machine. This power is in turn transmitted to the wide faced pinion 5 which transmits the same to the shiftable gear clutch 11. Shifting of the gear clutch 11 is controlled by the lever 25 and in the position shown in Figure 1, the shiftable gear clutch 11 is in mesh with the traction idler 14 whereby power is supplied to the traction devices. It is to be noted that in this position the brake band 18 is applied to the brake drum 15 by means of the parts 19, 28, and 27 respectively. The swing brake shaft 16 is therefore held stationary, which in turn prevents rotation of the excavator body A by means of the gear 17, gear clutch 9, swing shaft 8, and swing pinion and gears 7 and 6 respectively. When the lever 25 is moved to cause shifting of the gear clutch 11 in a downward direction, said gear clutch 11 no longer meshes with the traction idler 14 and the drive to the traction devices C is discontinued. The brake band 18 is also released from the brake drum 15 as is obvious. Such movement of the shiftable gear clutch 11 causes the same to engage the gear clutch 9, whereby swinging of the excavator body A about the traction base B results, the power being transmitted through 5, 11, 9, 8 and 7.

It can thus be readily seen that my invention provides a novel gearing assembly whereby power may be selectively supplied either to the traction devices or for swinging the body of an excavator. A very efficient and simple swing brake has also been provided together with connections for causing the same to be applied incident to the supplying of power to the traction devices.

Having thus described my invention, what I claim as new and desire to secure by Letters Patent of the United States, is:—

1. In an excavating machine, in combination, a body, a base upon which said body is mounted, a power shaft carried by the body, a wide faced pinion secured thereto, a shiftable gear clutch in constant mesh with said pinion, means for swinging the body in respect to the base, traction devices for the base, and mechanism for shifting the gear clutch so as to selectively drive the traction devices or the said means.

2. In an excavating machine, in combination, a body, a base upon which said body is mounted, a power shaft carried by the body, a wide faced pinion secured thereto, a shiftable gear clutch in constant mesh with said pinion, means for swinging the body in respect to the base, power driven mechanism including a gear, the means for swinging the body including a second gear clutch adapted to selectively engage with the shiftable gear clutch upon shifting of the same to cause a swinging of the body or to engage with said gear to drive said power mechanism and mechanism for shifting the shiftable gear clutch.

3. In an excavating machine, in combination, a body, a base upon which said body is mounted, a power shaft carried by the body, a wide faced pinion secured thereto, a shiftable gear clutch in constant mesh with said pinion, means for swinging the body in respect to the base, traction devices for the base, the means for swinging the body including a second gear clutch, and mechanism for selectively shifting the shiftable gear clutch to engage the second gear clutch for swinging the body or to cause operation of the traction devices.

4. In an excavating machine, in combination, a body, a base upon which said body is mounted, a power shaft carried by the body, a wide faced pinion secured thereto, a shiftable gear clutch in constant mesh with said pinion, means for swinging the body in respect to the base, and including a second gear clutch, a driven gear, traction devices operatively connected therewith, and mechanism for selectively shifting the shiftable gear clutch to drive the second gear clutch or the said driven gear, whereby the swing body and the traction devices are respectively operated.

5. In an excavating machine, in combination, a base, traction devices therefor, a body, means for swinging the body comprising a swing gear and pinion, a power shaft, a gear clutch mechanism for selectively connecting the power shaft to the traction devices or the said means, and a swing brake for the body operatively connected to the swing pinion, the said swing brake being actuated incident to operation of said gear clutch mechanism to connect the power shaft to the traction devices.

6. In an excavating machine, in combination, a base, traction devices therefor, a body, means for swinging the body including a gear clutch, a constantly driven shiftable gear clutch, mechanism for shifting the shiftable gear clutch to drive the traction devices or to engage the first named gear clutch for swinging the body, and a swing brake operatively connected to said first named gear clutch for preventing swinging of the body during periods when the traction devices are being driven.

7. In an excavating machine, in combination, a base, traction devices therefor, a body, means for swinging the body including a gear clutch, a constantly driven shiftable gear clutch, mechanism for shifting the shiftable gear clutch to drive the traction devices or to engage the first named gear clutch for swinging the body, a swing brake operatively connected to said first named gear clutch for preventing swinging of the body during periods when the traction devices are being driven, and connections between the shifting mechanism and the swing brake whereby the same is operated incident to operation of said mechanism.

In testimony whereof I affix my signature.

LESLIE A. RUSSELL.